Aug. 12, 1947.  W. A. ROOT  2,425,395
FRUIT JAR LIFTER
Filed Oct. 9, 1944
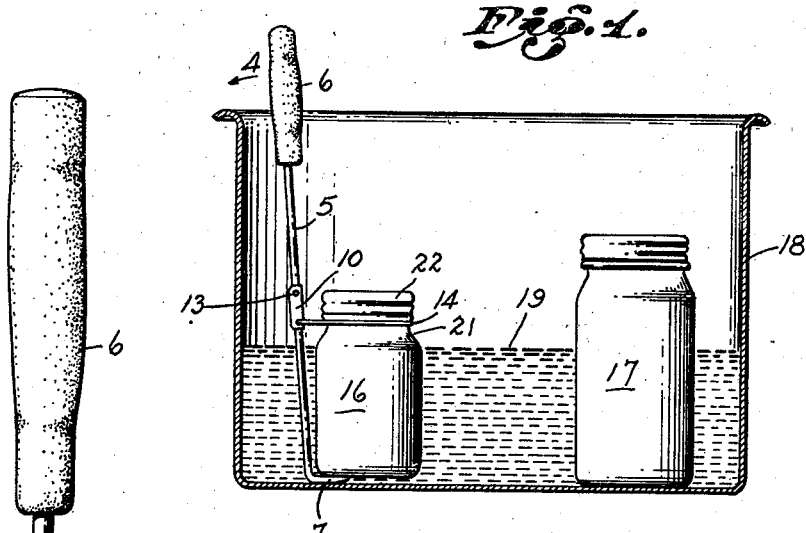
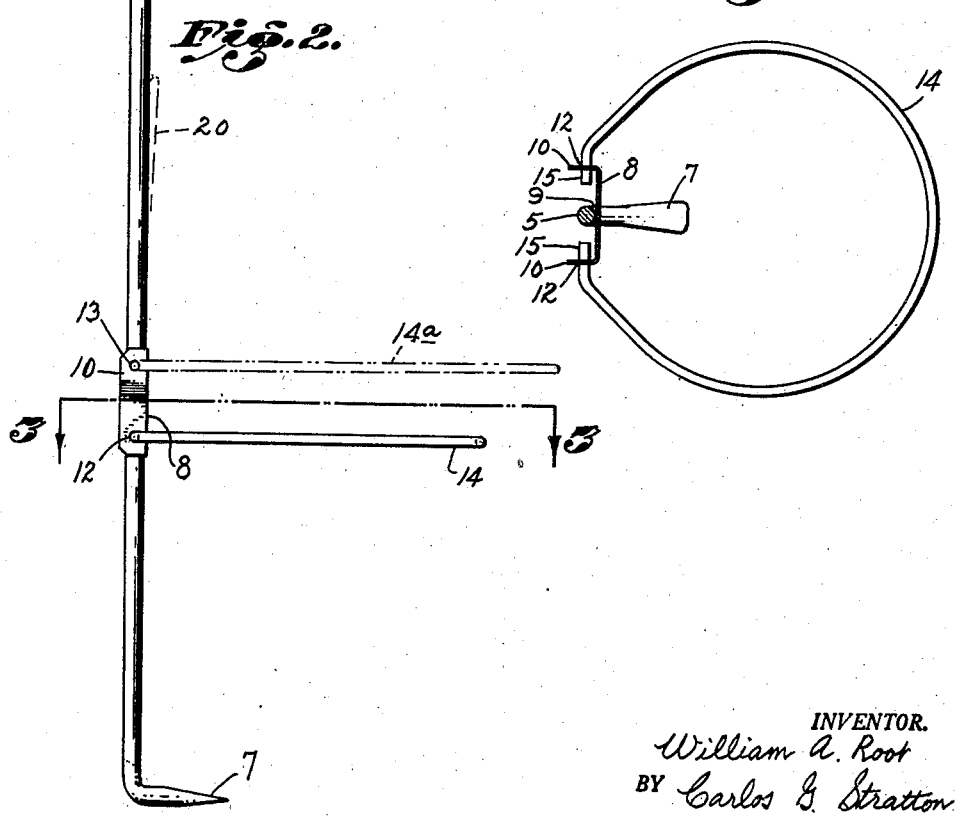
INVENTOR.
William A. Root
BY Carlos G. Stratton
ATTORNEY Patented Aug. 12, 1947

2,425,395

UNITED STATES PATENT OFFICE 2,425,395

FRUIT JAR LIFTER

William A. Root, Huntington Park, Calif.

Application October 9, 1944, Serial No. 557,830

3 Claims. (Cl. 294—32)

My invention relates to a fruit jar lifter, and more particularly to a device for handling hot fruit jars.

An important object of my invention is to provide such a device that will handle filled fruit jars as well as empty ones.

Another object is to provide such a device that may be adjusted to lift fruit jars of different sizes.

A still further object is to provide means to loop around the necks of fruit jars and at the same time to support the jars underneath same.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a vertical section through a container in which fruit jars are shown in elevation, one of which has my present device applied thereto.

Fig. 2 is an enlarged elevation of an embodiment of my invention.

Fig. 3 is a transverse section taken on the line 3—3 of Fig. 2.

Referring more in detail to the drawings, the reference number 5 indicates a shank of my device at the normally upper end of which is mounted a handle 6 of non-conductive material, such as wood or plastic. The lower end of the shank is bent substantially at right angles to provide a flattened foot 7 that is to be inserted under the jar to be lifted.

Fastened on the side of the shank 5 is a channel-shaped member 8, which may be welded in position, as suggested at 9. The side flanges 10 of the channel member have oppositely opposed pairs of openings 12 and 13 at different elevations.

A loop 14, preferably of resilient wire material, has its ends 15 snapped into one of the pairs of openings. In the drawings, the ends of the loop 14 are shown in the lower pair of openings 12. Due to the resilience of the wire 14, the loop may be spread outwardly and thereby removed from the openings 12. A larger loop 14a, for larger jars may be inserted in the upper pair of openings 13. To be inserted therein, the loop 14a is spread apart and the ends thereof arranged opposite in the openings 13. Upon release of the loop 14a, its inherent resilience causes the ends thereof to snap into position within the openings 13.

It is to be understood that my invention may be used with either small or large fruit jars, e. g., pints or quarts, as suggested at 16 and 17 respectively. The jars are shown in a pan 18 containing a body of hot water 19.

With my present device, it is possible to easily remove hot fruit jars from the hot water 19 without being burned. The device is tipped until the loop (14 or 14a) is at an acute angle to the upper portion of the shank 5, or the loop is manually lifted up alongside the shank 5 between the channel member 8 and the handle 6, as suggested at 20. In either event, the loop may be dropped around the jar and the foot 7 inserted thereunder by swinging the shank 5 away from the jar in the direction of the arrow 4 in Fig. 1 until the loop 14 is tight around the jar, as shown in Fig. 1. It is to be understood that the loop may also extend around the jar below the neck 21. With the loop in either position and with the foot under the jar, my device is ready to lift the hot fruit jar 16 out of the hot water 19.

Of course, when the jar has been set out upon some other support, the foot may be slipped out from under the jar and the loop 14 lifted up over the cap 22 of the jar, thus the device is easily removed from the jar without the operator ever having come in contact with any hot material.

By springing the loop out wider than the channel member 8, and upon inserting the ends of the loop in the selected pair of openings in the flanges 10, the inherent resilience of the loop will hold same in the openings. By selecting the appropriate size of loop and the respective pair of openings in the channel member, my device may be employed for removing different sizes of fruit jars from the hot water 19. It is also believed clear without further illustration, that my device may be made in various sizes so as to accommodate other sizes of jars than pints and quarts, to wit, half gallon jars and half pint jars.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a fruit jar lifter, a shank member, an apertured, channel-shaped body member mounted on the shank member, the apertures being arranged in pairs at different elevations in the channel-shaped member, a resilient loop yieldingly and pivotally mounted in the apertures of the body member at a given elevation, the loop being removable from said elevation and dimensioned to be pivotally mounted in the apertures of the body member at a different elevation, the inherent resilience of the loop tending to maintain it in its pivoted relation with the body member in each elevation.

2. In a fruit jar lifter, a shank member, an apertured, channel-shaped body member on the shank member, the apertures being arranged at different elevations in the channel-shaped member, a loop pivotally mounted in the apertures of the body member at a given elevation, the loop being removable from said elevation and dimensioned to be pivotally mounted in the apertures of the body member at a different elevation, and a member on the shank member arranged to be inserted under a fruit jar disposed to be embraced by the loop.

3. In a fruit jar lifter, a shank member, a channel-shaped body member fixed on the shank member and having apertures at different elevations, a resilient expansible loop having its ends pivotally mounted on the channels of the body member in selected apertures thereof, and a member on the shank member arranged to be inserted under a fruit jar disposed to be embraced by the loop.

WILLIAM A. ROOT.

REFERENCES CITED

The following references are of record in the file of this patent:

UNITED STATES PATENTS

| Number | Name | Date |
|---|---|---|
| 791,504 | Rosenfeld | June 6, 1905 |
| 1,335,446 | McDaniel | Mar. 30, 1920 |
| 1,363,928 | Shirkey | Dec. 28, 1920 |
| 2,092,456 | Hunker | Sept. 7, 1937 |